US012255954B2

(12) United States Patent
Feng et al.

(10) Patent No.: US 12,255,954 B2
(45) Date of Patent: Mar. 18, 2025

(54) SYSTEM AND METHOD FOR DATA MANAGEMENT WITH MOBILITY SUPPORT IN DISTRIBUTED EDGE CLOUD

(71) Applicant: Telefonaktiebolaget LM Ericsson (publ), Stockholm (SE)

(72) Inventors: Jinhua Feng, Taby (SE); Nanjangud Chandrasekhara Swamy Narendra, Bangalore (IN); Srinivasa Vinay Yadhav, Upplands Vasby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 88 days.

(21) Appl. No.: 17/936,775

(22) Filed: Sep. 29, 2022

(65) Prior Publication Data
US 2024/0114069 A1   Apr. 4, 2024

(51) Int. Cl.
*H04L 67/1095* (2022.01)
*H04L 67/146* (2022.01)

(52) U.S. Cl.
CPC ........ *H04L 67/1095* (2013.01); *H04L 67/146* (2013.01)

(58) Field of Classification Search
CPC .......... H04L 67/1095; H04L 67/146
See application file for complete search history.

(56) References Cited

U.S. PATENT DOCUMENTS

| | | | | |
|---|---|---|---|---|
| 6,957,074 B2 * | 10/2005 | Wang | ................... | H04W 28/26 455/450 |
| 7,805,583 B1 * | 9/2010 | Todd | ................... | G06F 3/0647 711/161 |
| 11,917,483 B2 * | 2/2024 | Mátray | ................... | G06F 16/27 |
| 2007/0143005 A1 * | 6/2007 | Chiou | ................... | H04W 24/08 701/467 |

(Continued)

OTHER PUBLICATIONS

"3rd Generation Partnership Project; Technical Specification Group Radio Services and System Aspects; Architecture enhancements for 5G System (5GS) to support network data analytics services (Release 17)", 3GPP TS 23.288 V17.5.0, (Jun. 2022), pp. 1-207.

(Continued)

*Primary Examiner* — Nazia Naoreen
(74) *Attorney, Agent, or Firm* — Nicholson, De Vos, Webster & Elliott, LLP; Daniel J. Lee (57) ABSTRACT

Disclosed herein is a method performed by one or more computing devices implementing a data readiness manager to proactively migrate and replicate user session data in a distributed edge cloud. The method includes receiving, from a local data management agent of a source data node, an indication to perform data readiness operations for a user session, wherein the source data node is associated with a service instance being accessed by a user associated with the user session, determining a predicted mobility of the user, determining one or more target data nodes based on the predicted mobility of the user, wherein each of the one or more target data nodes is associated with a service instance (Continued)

that is determined to have a sufficiently high probability of being accessed by the user at a future time, and causing data associated with the user session to be migrated and replicated from the source data node to each of the one or more target data nodes.

20 Claims, 6 Drawing Sheets

(56) References Cited

U.S. PATENT DOCUMENTS

| | | | | |
|---|---|---|---|---|
| 2016/0295448 | A1* | 10/2016 | Cai | H04W 40/18 |
| 2021/0051762 | A1* | 2/2021 | Young | H04W 36/12 |
| 2022/0272597 | A1* | 8/2022 | Kumar | H04W 36/245 |
| 2022/0329648 | A1* | 10/2022 | De Foy | H04L 67/34 |
| 2023/0403434 | A1* | 12/2023 | Kondratovsky | H04N 21/8456 |

OTHER PUBLICATIONS

Abbas, M., "O-Ran Alliance Towards Open and Smart Ran," 5G Hub Technologies, Inc. Blog, Aug. 25, copyright 2022, downloaded from https://5ghub.us/o-ran-alliance-towards-open-and-smart-ran/ on Sep. 28, 2022, 7 pages.

Apache Software Foundation, "Apache Ignite Documentation," Overview, v 2.13.0, downloaded from https://ignite.apache.org/docs/latest/ on Sep. 28, 2022, 3 pages.

Apache Software Foundation, "Data Partitioning," Apache Ignite Documentation, v 2.13.0, downloaded from https://ignite.apache.org/docs/latest/data-modeling/data-partitioning#backup-partitions on Sep. 28, 2022, 6 pages.

Wang, et al., "Research on mobility prediction in 5G and beyond for vertical industries," 2021 IEEE/CIC International Conference on Communications in China (ICCC Workshops), Jul. 28-30, 2021, 5 pages.

\* cited by examiner

SYSTEM AND METHOD FOR DATA MANAGEMENT WITH MOBILITY SUPPORT IN DISTRIBUTED EDGE CLOUD

TECHNICAL FIELD

Embodiments of the invention relate to the field of distributed computing, and more specifically, to proactively migrating and replicating user session data in a distributed edge cloud.

BACKGROUND

A distributed edge cloud can be used to deploy services at the edge of communication networks, closer to users, which helps reduce latency and thus improve the quality of experience for users. An important requirement for distributed edge cloud is the ability to seamlessly migrate services being provided to users in response to user mobility without negatively affecting the user experience. This includes the ability to seamlessly migrate user session data along with the services to ensure adherence to any quality of service (QoS) requirements. Some conventional solutions for managing user session data in distributed edge cloud environments rely on a distributed data layer to replicate user session data across various areas/locations. These solutions typically replicate user session data across all data nodes in the distributed edge cloud or a fixed subset of the data nodes. However, such solutions are not suitable for resource-constrained environments such as distributed edge cloud environments (e.g., these solutions may unnecessarily replicate user session data on data nodes that will not be accessed by the service). Some conventional solutions for managing user session data in distributed edge cloud environments rely on the service deployed in the distributed edge cloud to migrate and/or replicate user session data. However, such solutions are undesirable because they increase the complexity of service implementation and do not have the flexibility to handle new triggers of data migration that could occur in distributed edge cloud environments.

SUMMARY

Disclosed herein is a method performed by one or more computing devices implementing a data readiness manager to proactively migrate and replicate user session data in a distributed edge cloud. The method includes receiving, from a local data management agent of a source data node, an indication to perform data readiness operations for a user session, wherein the source data node is associated with a service instance being accessed by a user associated with the user session, determining a predicted mobility of the user, determining one or more target data nodes based on the predicted mobility of the user, wherein each of the one or more target data nodes is associated with a service instance that is determined to have a sufficiently high probability of being accessed by the user at a future time, and causing data associated with the user session to be migrated and replicated from the source data node to each of the one or more target data nodes.

Disclosed herein is a non-transitory machine-readable storage medium that provides instructions that, if executed by one or more processors of one or more computing devices implementing a data readiness manager, causes the one or more computing devices to perform operations for proactively migrating and replicating user session data in a distributed edge cloud. The operations include receiving, from a local data management agent of a source data node, an indication to perform data readiness operations for a user session, wherein the source data node is associated with a service instance being accessed by a user associated with the user session, determining a predicted mobility of the user, determining one or more target data nodes based on the predicted mobility of the user, wherein each of the one or more target data nodes is associated with a service instance that is determined to have a sufficiently high probability of being accessed by the user at a future time, and causing data associated with the user session to be migrated and replicated from the source data node to each of the one or more target data nodes.

BRIEF DESCRIPTION OF THE DRAWINGS

The invention may best be understood by referring to the following description and accompanying drawings that are used to illustrate embodiments of the invention. In the drawings.

DETAILED DESCRIPTION

The following description describes methods, systems, and apparatus for proactively migrating and replication user session data in a distributed edge cloud. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/ or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/ or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, conventional solutions for managing user session data in distributed edge cloud environments can waste storage resources (e.g., by unnecessarily replicating user session data to all data nodes or a fixed subset of data nodes) and/or increase the complexity of service implementation (e.g., by relying on the services themselves to handle the migration and/or replication of user session data).

Embodiments disclosed herein may address one or more of these shortcomings by providing a data readiness manager that coordinates the proactive migration and replication of user session data to the relevant data nodes to ensure that the user session data is ready to be accessed in cases of user mobility. According to some embodiments, the data readiness manager determines the predicted mobility of a user and determines which service instances have a sufficiently high probably of being accessed by the user based on the predicted mobility of the user. The data readiness manager may then determine the target data nodes that are associated with (or expected to be associated with) the service instances and cause user session data for the user to be migrated/ replicated to those target data nodes. This allows user session data to be ready in the relevant data nodes in the event that the user moves to a new area/location and starts accessing a new service instance. Notably, the user session data need not be migrated and replicated to every data node or a fixed subset of data nodes in the distributed edge cloud (as done with conventional solutions), but the user session data can be migrated and replicated only to those data nodes that are associated with service instances that have a sufficiently high probability of being accessed by the user in the near future. This allows for conserving valuable storage resources in the distributed edge cloud while still providing seamless access to user session data in cases of user mobility. Embodiments may leverage a customized distributed in-memory framework to store user session data, which may further reduce data access latency. Embodiments may decouple (or loosely couple) the service from the data layer, which simplifies service implementation with regard to handling user session data migration and replication in the case of user mobility. The data readiness manager may coordinate the proactive migration and replication of user session data to the relevant data nodes "behind the scenes" so that the service itself does not need to be intimately involved with making user session data migration and replication decisions. Embodiments are now described with reference to the accompanying figures.

Figure 1:
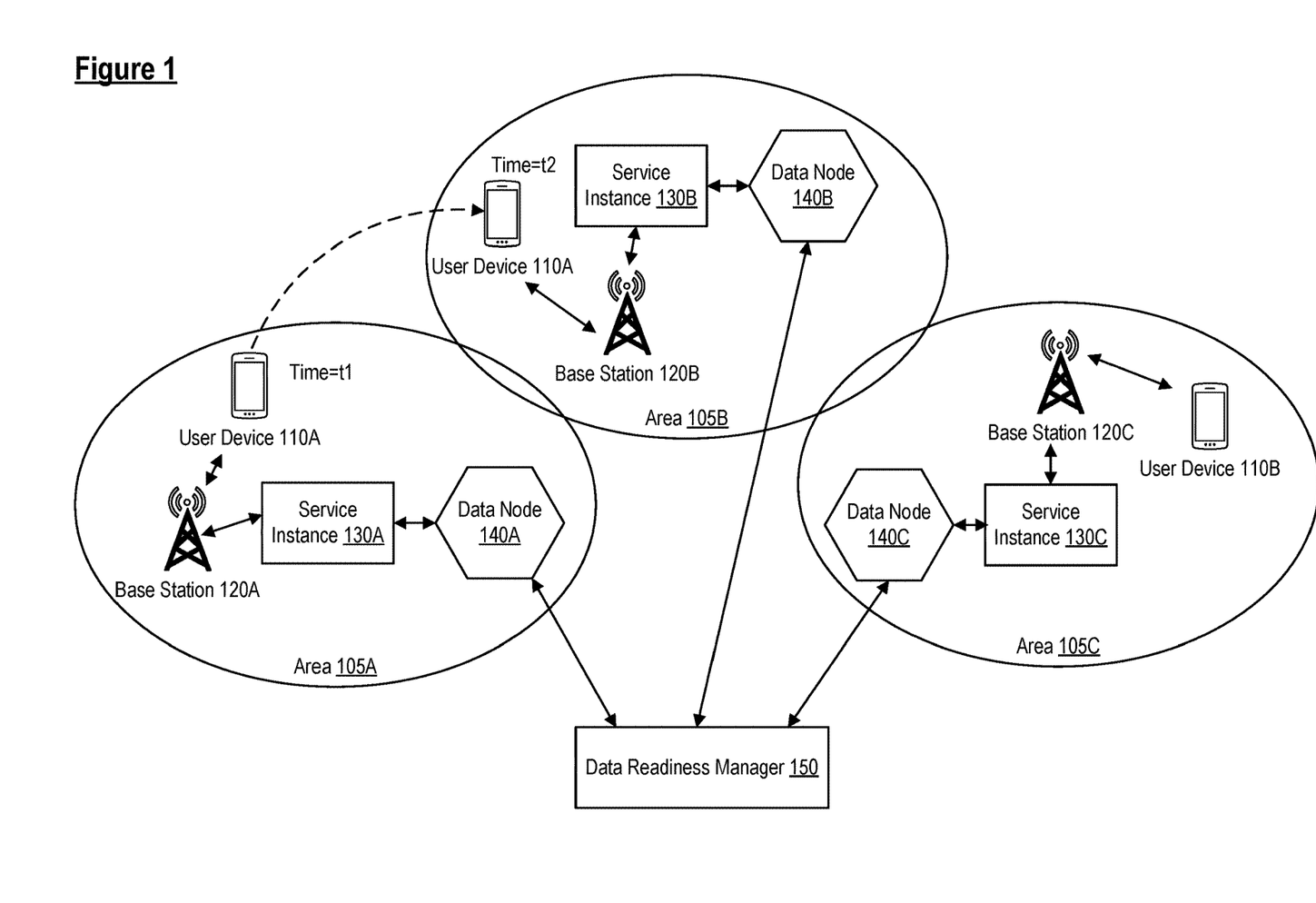
FIG. 1 is a diagram showing a distributed edge cloud environment in which data readiness operations can be performed, according to some embodiments.

FIG. 1 is a diagram showing a distributed edge cloud environment in which data readiness operations can be performed, according to some embodiments.

As shown in the diagram, the environment includes service instances 130 associated with a service that are deployed in different areas 105 to serve users located in the different areas 105. For example, as shown in the diagram, service instance 130A is deployed in area 105A, service instance 130B is deployed in area 105B, and service instance 130C is deployed in area 105C. In an embodiment, a service instance 130 is a microservice or a collection of microservices. Each service instance 130 may be associated with one or more data nodes 140. For example, service instance 130A may be associated with data node 140A, service instance 130B may be associated with data node 140B, and service instance 130C may be associated with data node 140C. A service instance 130 may communicate with its associated data node(s) 140 to access (create, read, update, and delete) user session data. Typically, service instances 130 are associated with data node(s) 140 that are located in the same area 105 as the service instances 130 (or otherwise proximate to the service instances 130) for efficiency/latency reasons but this is not strictly required. In an embodiment, the distributed edge cloud is implemented in a mobile network such as a Fifth Generation (5G) mobile network. The mobile network may include base stations 120 located in different areas 105. A user that is located in a certain area 105 may connect to a base station 120 located in that area 105 to access a service instance 130 deployed in that area 105. For example, as shown in the diagram, at time t1, the user operating user device 110A is located in area 105A, and thus may connect to base station 120A to access service instance 130A. Similarly, as shown in the diagram, the user operating user device 110B is located in area 105C, and thus may connect to base station 120C to access service instance 130C. When a user accesses a service instance 130, the service instance 130 may create, read, update, and/or delete (CRUD) user session data in the data node 140 associated with the service instance 130. For example, at time t=1, service instance 130A may create, read, update, and/or delete user session data for the user operating user device 110A in data node 140A. Similarly, service instance 130C may create, read, update, and/or delete user session data for the user operating user device 110B in data node 140C.

As mentioned above, in an embodiment, the distributed edge cloud is implemented in a mobile network. In such an embodiment, the user devices 110 may be UEs (user equipment) and the base stations 120 may be eNodeBs or gNodeBs (or other type of radio base station).

When a user leaves an area 105 and moves to a new area 105, the user may connect to a new base station 120 and start accessing a new service instance 130 that is "closer" (e.g., in terms of latency and/or geographic distance) to the user (e.g., to ensure a smooth quality of experience (QoE) with relevant QoS requirements fulfilled). To provide user session continuity, the user session data for the user should be migrated from the old data node 140 (associated with the old service instance 130) to the new data node 140 (associated with the new service instance 130 in the new area 105) in a timely manner so that the new service instance 130 can access the user session data for the user. For example, as shown in the diagram, at time t2, the user operating user device 110A may move from area 105A to area 105B. As a result, the user may connect to base station 120B and start accessing service instance 130B. To provide user session continuity, the user session data for the user that is stored in data node 140A should be migrated to data node 140B so that service instance 130B can access the user session data and continue the user session.

As shown in the diagram, the environment further includes a data readiness manager 150. As will be described in further detail herein, the data readiness manager 150 may coordinate with data nodes 140 to proactively migrate and replicate user session data to the relevant data nodes 140 to ensure that user session data is ready to be accessed in cases of user mobility. The data readiness manager 150 may determine the predicted mobility of a user and determine which service instances 130 have a sufficiently high probably of being accessed by the user based on the predicted mobility of the user. The data readiness manager 150 may then determine the target data nodes 140 that are associated with (or expected to be associated with) the service instances 130 and cause user session data to be migrated/replicated to those target data nodes 140. For example, with embodiments disclosed herein, the data readiness manager 150 may determine at time t1 that the user operating user device 110A is predicted to move from area 105A to area 105B at or around time t2. Thus, the data readiness manager 150 may coordinate with the data node 140A and/or data node 140B to cause user session data for the user to be proactively migrated and replicated from data node 140A to data node 140B (before time t2) so that the user session data is ready to be accessed by service instance 130B if the user moves to area 105B and starts accessing service instance 130B. Further details of the data readiness manager 150 and the data nodes 140 are provided herein below.

Figure 2:
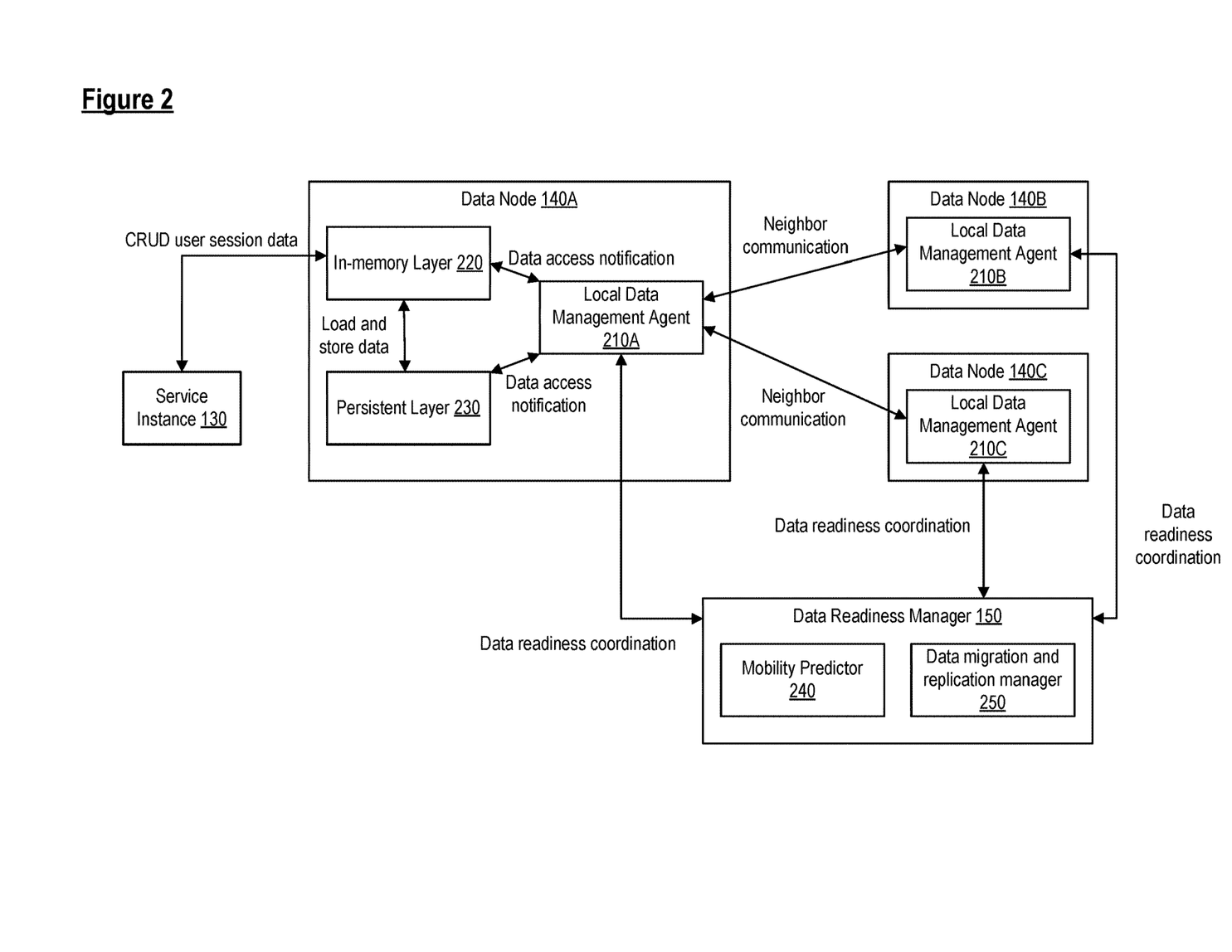
FIG. 2 is a diagram showing components of a data node and a data readiness manager, according to some embodiments.

FIG. 2 is a diagram showing components of a data node and a data readiness manager, according to some embodiments.

As shown in the diagram, data node 140A includes an in-memory layer 220, a persistent layer 230, and a local data management agent 210A. A service instance 130 associated with data node 140A may create, read, update, and/or delete (CRUD) user session data in the in-memory layer 220 (e.g., using in-memory related libraries). User session data for a user may include information regarding the user's state in relation to a service being accessed by the user and/or contextual data related to the service. For example, for an online gaming service, the user session data may include information regarding the current scene/environment in the game, information regarding the players participating in the game (e.g., how many and what moves they have made), information regarding the current progress of the game, etc. Of course, it will be recognized that user session data can include other types of information depending on the service being provided. The in-memory layer 220 allows for faster and more efficient data access compared to the persistent layer 230. In an embodiment, the in-memory layer 220 is implemented using volatile memory. In an embodiment, the user session data is stored in the in-memory layer 220 using key-value structures but other means of storing data are possible.

The in-memory layer 220 may store data in the persistent layer 230 and/or load data from the persistent layer 230 (e.g., at the request of a service instance 130). The persistent layer 230 allows for storing user session data in a more permanent way. In an embodiment, the persistent layer 230 is implemented using non-volatile memory. For example, the persistent layer 230 may be implemented using a database.

The in-memory layer 220 and/or the persistent layer 230 may notify the local data management agent 210A when access of user session data is detected. In an embodiment, the in-memory layer 220 and the persistent layer 230 are provided by a distributed data management framework (e.g., Apache® Ignite®).

The local data management agent 210A may communicate with the data readiness manager 150 to indicate when data readiness operations are to be performed for a user session. The local data management agent 210A may also communicate with the local data management agents 210 of logically neighboring data nodes 140B and 140C to coordinate the migration and replication of user session data between the data nodes 140. Data nodes 140B and 140C may have a similar configuration as data node 140A. For example, although not shown in the diagram, data nodes 140B and 140C may each have an in-memory layer 220 and a persistent layer 230 similar to data node 140A.

Also, as shown in the diagram, the data readiness manager 150 includes a mobility predictor 240 and a data migration and replication manager 250. The mobility predictor 240 may determine the predicted mobility of a user. For example, the mobility predictor 240 may predict which areas 105 (if any) a user might move to in the near future (and the probabilities of the user moving to those areas 105) based on various information (e.g., the current location of the user, historical mobility patterns of the user or other users near that location, information obtained from a mobile network implementing the distributed edge cloud, etc.). The mobility predictor 240 may provide information regarding the predicted mobility of the user to the data migration and replication manager 250.

The data migration and replication manager 250 may determine the target data nodes 140 that user session data for a user should be migrated and replicated to based on the predicted mobility of the user (e.g., which may be provided by the mobility predictor 240). The data migration and replication manager 250 may then communicate with the local data management agents 210 of the relevant data nodes 140 to cause the user session data to be migrated and replicated to the relevant data nodes 140.

The various components shown in the diagram may perform operations and interact to proactively migrate and replicate user session data to the relevant data nodes 140 so that the user session data is ready to be accessed by service instances in cases of user mobility. The operations and interactions are described in further detail herein below with reference to FIG. 3.

While a certain arrangement of components is shown in the diagram to illustrate an embodiment, it should be understood that the arrangement is provided by way of example, and not meant to limit embodiments to a particular arrangement. Other embodiments may use a different arrangement of components to achieve the same/similar functionality.

In an embodiment, one or more of the components are implemented in a cloud native way. For example, the data nodes 140 may be implemented and deployed as DaemonSet pods in Kubernetes® clusters. Additionally or alternatively, the data readiness manager 150 may be implemented as a microservice having replicas distributed and deployed in a cloud computing environment. Additionally or alternatively, the mobility predictor 240 may use machine learning capabilities provided by the underlying cloud infrastructure (e.g., Intel® XEON® with deep learning (DL) boost) to accurately predict the mobility of users.

Figure 3:
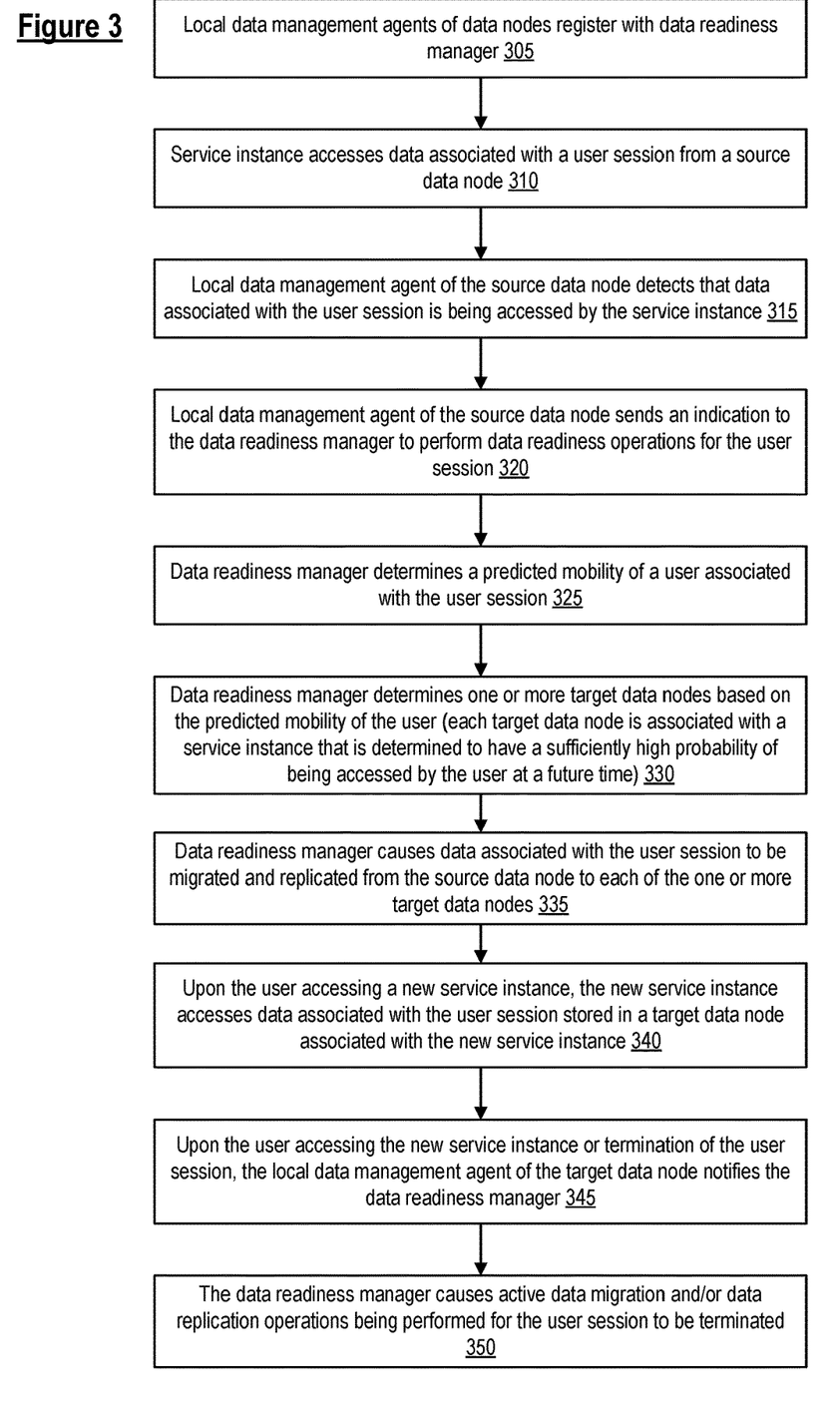
FIG. 3 is a flow diagram of a method for performing data readiness operations, according to some embodiments.

FIG. 3 is a flow diagram of a method for performing data readiness operations, according to some embodiments. The method may be performed in a distributed edge cloud environment.

The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

While the flow diagrams in the figures show a particular order of operations performed by certain embodiments, it should be understood that such order is provided as an example to illustrate an embodiment (e.g., alternative embodiments may perform the operations in a different order, combine certain operations, overlap certain operations, etc.).

At operation 305, local data management agents of data nodes register with the data readiness manager. In an embodiment, a local data management agent provides the following information to the data readiness manager when registering with the data readiness manager: (1) the identifier of the local data management agent—this could be a universally unique ID (UUID) or other type of identifier that the data readiness manager can use to identify/differentiate local data management agents; (2) the corresponding edge/cloud node hosting the data node—this could be, for example, the name of the node in a Kubernetes® cluster, the name of a virtual machine, or the name of a server providing user session data management; (3) the communication channel by which the local data management agent is to receive data migration/replication instructions from the data readiness manager—this could be, for example, the endpoints through which the data readiness manager can communicate with the local data management agent (e.g., REST (representation state transfer) or gRPC (or other remote procedure call (RPC)) endpoints).

At operation 310, a service instance accesses (creates/reads/updates/deletes) data associated with a user session from a source data node (e.g., as part of serving a user that is accessing the service instance).

At operation 315, the local data management agent of the source data node detects that data associated with the user session is being accessed by the service instance. In an embodiment, the local data management agent of the source node detects that data associated with the user session is being accessed by the service instance based on listening to the session data access events generated by a distributed data management framework that is being used to manage user session data. For example, the local data management agent of the source node may listen to the "EVT_CACHE_OBJECT_PUT" and/or "EVT_CACHE_OBJECT_READ" events generated by Apache® Ignite®, which are generated when data is created and read from the in-memory layer, respectively.

At operation 320, responsive to detecting that data associated with the user session is being accessed, the local data management agent of the source node sends an indication to the data readiness manager to perform data readiness operations for the user session. In an embodiment, the indication that the local data management agent sends to the data readiness manager includes an identifier of the user session so that data readiness manager can identify the user session for which data readiness operations are to be performed. In an embodiment, the indication that the local data management agent sends to the data readiness manager includes an indication of whether new user session data for the user is being created in the source node or an indication of whether user session data for the user is being read/loaded from the source data node for the first time.

In the case that user session data for the user is being read/loaded from the source data node for the first time (e.g., using a key associated with the users session data), the data readiness manager may determine whether there are any active data migration and/or data replication operations being performed for the user session, and if so, cause those data migration and/or replication operations to be terminated (e.g., by sending instructions to the local data management agents of the data nodes involved in performing the data migration and/or data replication operations). The data readiness manager may then cause the user session data for the user to be migrated and replicated to the relevant target data nodes, as described further herein below. In the case that new user session data for the user is being created in the source data node, there should be no active data migration and/or data replication being performed for the user session so there may be no need to terminate any data migration or data replication operations.

At operation 325, the data readiness manager (e.g., the mobility predictor of the data readiness manager) determines a predicted mobility of the user associated with the user session. The data readiness manager may determine the predicted mobility of a user using information available to itself and/or using information obtained from other systems (e.g., Network Data Analytics Function (NWDAF) provided by 5G mobile networks). In an embodiment, the data readiness manager determines the predicted mobility of a user based on one or more of the current location of the user, historical mobility patterns of the user, historical mobility patterns of other users, and contextual information such as traffic paths information (e.g., information regarding the layout of roads, sidewalks, train tracks, etc.). In an embodiment, the data readiness manager determines the predicted mobility of the user using a machine learning system. In an embodiment, information regarding the user's actual location and movement can be fed back to the machine learning system to further train/improve the machine learning system.

At operation 330, the data readiness manager (e.g., the data migration and replication manager of the data readiness manager) determines one or more target data nodes based on the predicted mobility of the user. The data readiness manager may determine the one or more target data nodes by determining which service instances have a sufficiently high probability of being accessed by the user at a future time based on the predicted mobility of the user and determining the target nodes that are associated with those service instances. Thus, each target data node may be associated with a service instance that is determined to have a sufficiently high probability of being accessed by the user at a future time. What is considered to be a sufficiently high probability may be configurable depending on the implementation. The target data nodes may include logical neighbors of the source data node and/or include data nodes that are further removed from the source data node.

As an example, if it is assumed that a user U1 is currently located in an edge zone E1, the data readiness manager may determine whether user U1 will move out of edge zone E1 and determine which edge zones the user is likely to move to. If it is assumed that an initial model based on Markov chains is being used, probabilities may be assigned to the above items. For example, the data readiness manager may determine based on analyzing the historical mobility patterns of user U1 that the probability of user U1 moving out of the current edge zone is 0.6 (or 60 percent) and the probability of user U1 moving from edge zone E1 to edge zone E2 is 0.8 (or 80 percent). Thus, the data readiness manager may determine that the overall probability of U1 moving from edge zone E1 to edge zone E2 is 0.6×0.8=0.48 (or 48 percent). The data readiness manager may then determine that the probability of user U1 moving from edge zone E1 to edge zone E2 is sufficiently high, and thus initiate proactive data migration and/or replication to data nodes located in edge zone E2. In an embodiment, probabilities can be determined based on reinforcement learning. The data readiness manager may be trained with historical data to arrive at probabilities, as described above. In an embodiment, the training parameters can be adjusted based on actual performance so that the prediction capability can be improved over time. For example, the probability of U1 moving from edge zone E1 to edge zone E2 could be improved from 0.8 to 0.9, which would make the overall probability of user U1 moving from edge zone E1 to edge zone E2 0.6×0.9=0.54 (or 54 percent).

At operation 335, the data readiness manager causes data associated with the user session to be migrated and replicated from the source data node to each of the one or more target data nodes. In an embodiment, the data readiness manager causes the data to be migrated and replicated based on sending instructions/configurations to the local data management agents of the source data node and/or the target data nodes to migrate and replicate the data.

Any changes to the user session data in the source data node may be continuously replicated to the relevant target data nodes and be made available in the in-memory layer (e.g., cache) of the target data nodes so that if the user starts accessing one of the service instances associated with one of the target data nodes, the service instance has immediate access to the user session data for the user. In an embodiment where Apache® Ignite® is used as the distributed data management framework, "replication" mode can be used to replicate the user session data related partitions among the server nodes in the cluster. In this case, the service node of an Apache® Ignite® cluster can function as the local data management agent. In an embodiment, a customized "replication" plugin can be used to only replicate the relevant partition on the selected server nodes by configuring backup-partitions according to the user mobility prediction result.

In an embodiment, if the data readiness manager determines that multiple users share similar mobility (e.g., users sitting in the same train or bus), then the data readiness manager may cause user session data for all of these users to be migrated and replicated to the target data nodes.

At operation 340, upon the user accessing a new service instance (e.g., because the user moved to a new area/location), the new service instance accesses data associated with the user session stored in a target data node associated with the new service instance (and seamlessly continues the session).

At operation 345, upon the user accessing the new service instance or termination of the user session, the local data management agent of the target data node notifies the data readiness manager.

At operation 350, responsive to receiving the notification from the local data management agent, the data readiness manager causes active data migration and/or replication operations being performed for the user session to be terminated. In an embodiment where Apache® Ignite® is being used as the distributed data management framework, the data readiness manager may cause active data migration and/or data replication operations to be terminated by removing the source data node from the backup-partitions and designating the target data node as the primary partition.

Thus, the operations described above may be carried out in a distributed edge cloud environment to proactively migrate and replicate user session data to the relevant data nodes so that the user session data is read to be accessed by service instances in the event of user mobility. Notably, the user session data need not be migrated and replicated to every data node or a fixed subset of data nodes in the distributed edge cloud (as done with conventional solutions), but the user session data can be migrated and replicated only to those data nodes that are associated with service instances that have a sufficiently high probability of being accessed by the user in the near future. This allows for conserving valuable storage resources in the distributed edge cloud while still providing seamless access to user session data in cases of user mobility. Embodiments may leverage a customized distributed in-memory framework to store user session data, which may further reduce data access latency. Embodiments may decouple (or loosely couple) the service from the data layer, which simplifies service implementation with regard to handling user session data migration and replication in the case of user mobility. The data readiness manager may coordinate the proactive migration and replication of user session data to the relevant data nodes "behind the scenes" so that the service itself does not need to be intimately involved with making user session data migration and replication decisions.

Embodiments may be particularly suitable for deploying in a distributed edge cloud implemented in a mobile network (e.g., a 5G mobile network). For example, embodiments may be implemented as part of a service management and orchestration (SMO) framework. The data readiness manager may be implemented in a radio access network intelligent controller (RIC) and the local data management agents may be implemented in the O-DU (open distributed unit) and/or O-CU (open centralized unit).

For future 5G and 6G mobile networks, it is expected that the agility and dynamism of the services and data deployed in those mobile networks will become important. Embodiments disclosed herein may be used for network function implementation in mobile networks (e.g., AMF, SMF, etc. in 5G Core for UE session context migration among different nodes and O-RAN (open RAN) for RAN level UE mobility related functionalities).

Figure 4:
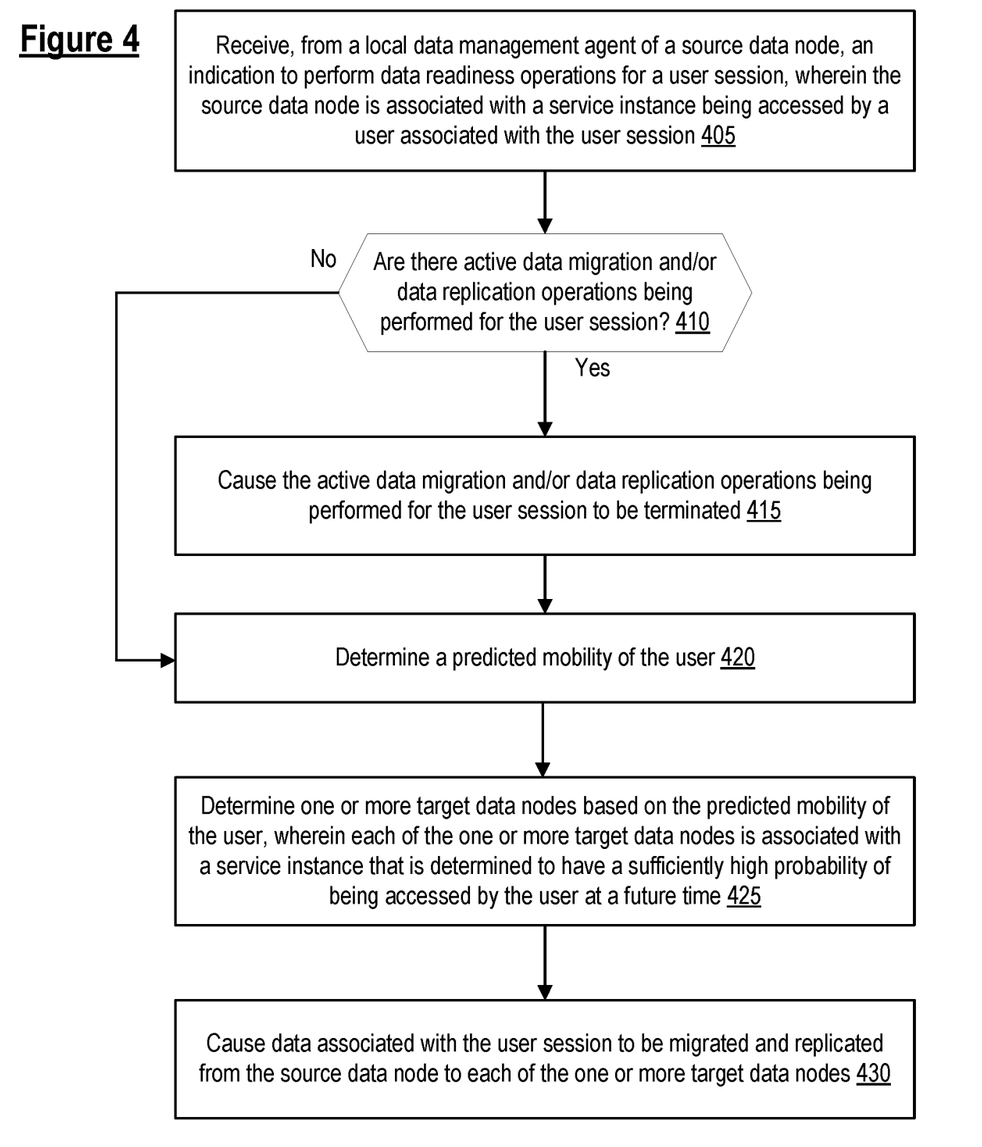
FIG. 4 is a flow diagram of a method performed by a data readiness manager for performing data readiness operations, according to some embodiments.

FIG. 4 is a flow diagram of a method performed by a data readiness manager for performing data readiness operations, according to some embodiments. The method may be implemented by one or more computing devices implementing the data readiness manager 150.

At operation 405, the data readiness manager receives, from a local data management agent of a source data node, an indication to perform data readiness operations for a user session, wherein the source data node is associated with a service instance being accessed by a user associated with the user session. In an embodiment, the indication to perform data readiness operations for the user session includes a session identifier of the user session. In an embodiment, the indication to perform data readiness operations for the user session is sent by the local data management agent of the source data node to the data readiness manager due to the local data management agent of the source data node detecting that data associated with the user session stored in the source data node is being accessed by the service instance associated with the source data node.

In an embodiment, at operation 410, the data readiness manager determines whether there are active data migration and/or data replication operations being performed for the user session. If not, the method proceeds to operation 420. Otherwise, if there are active data migration and/or data replication operations being performed for the user session, then at operation 415, the data readiness manager causes the active data migration and/or data replication operations being performed for the user session to be terminated, and the method proceeds to operation 420.

At operation 420, the data readiness manager determines a predicted mobility of the user. In an embodiment, the predicted mobility of the user is determined based on one or more of: a current location of the user, historical mobility patterns of the user, historical mobility patterns of other users, and traffic paths information. In an embodiment, the user operates a user device connected to a mobile network and the data readiness manager communicates with the mobile network to obtain one or more of: the current location of the user, the historical mobility patterns of the user, and the historical mobility patterns of other users. In an embodiment, the predicted mobility of the user is determined using a machine learning system.

At operation 425, the data readiness manager determines one or more target data nodes based on the predicted mobility of the user, wherein each of the one or more target data nodes is associated with a service instance that is determined to have a sufficiently high probability of being accessed by the user at a future time.

At operation 430, the data readiness manager causes data associated with the user session to be migrated and replicated from the source data node to each of the one or more target data nodes. In an embodiment, part of the data associated with the user session that is migrated and replicated to a target data node is stored in an in-memory layer of the target data node while another part of the data associated with the user session that is migrated and replicated to the target data node is stored in a persistent layer of the target data node. In an embodiment, responsive to determining that one or more other users share a sufficiently similar predicted mobility as the user, the data readiness manager causes data associated with user sessions associated with the one or more other users to be migrated and replicated from the source data node to each of the one or more target data nodes. In an embodiment, causing the data associated with the user session to be replicated from the source data node to each of the one or more target data nodes involves communicating with the local data management agent of the source data node and/or communicating with one or more local data management agents of the one or more target data nodes. In an embodiment, the data readiness manager registers the local data management agent of the source data node and the one or more local data management agents of the one or more target data nodes, with the data readiness manager.

Figure 5:
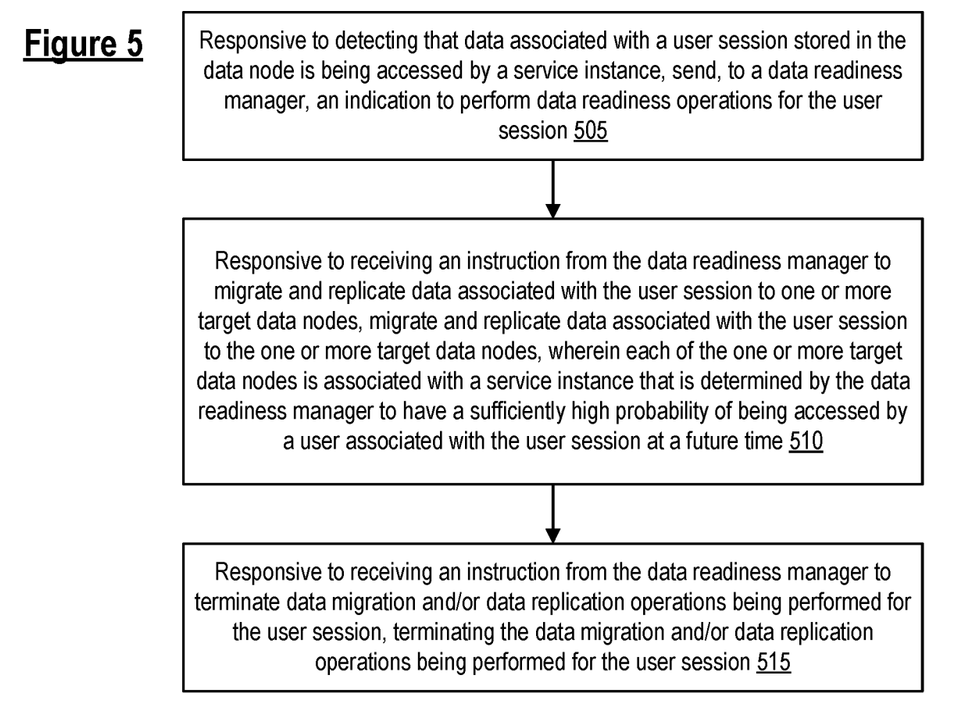
FIG. 5 is a flow diagram of a method performed by a local data management agent of a data node for performing data readiness operations, according to some embodiments.

FIG. 5 is a flow diagram of a method performed by a local data management agent of a data node for performing data readiness operations, according to some embodiments. The method may be implemented by one or more computing devices implementing the local data management agent 210.

At operation 505, responsive to detecting that data associated with a user session stored in the data node is being accessed by a service instance, the local data management agent sends, to a data readiness manager, an indication to perform data readiness operations for the user session.

At operation 510, responsive to receiving an instruction from the data readiness manager to migrate and replicate data associated with the user session to one or more target data nodes, the local data management agent migrates and replicates data associated with the user session to the one or more target data nodes, wherein each of the one or more target data nodes is associated with a service instance that is determined by the data readiness manager to have a sufficiently high probability of being accessed by a user associated with the user session at a future time.

At operation 515, responsive to receiving an instruction from the data readiness manager to terminate data migration and/or data replication operations being performed for the user session, the local data management agent terminates the data migration and/or data replication operations being performed for the user session.

Figure 6A:
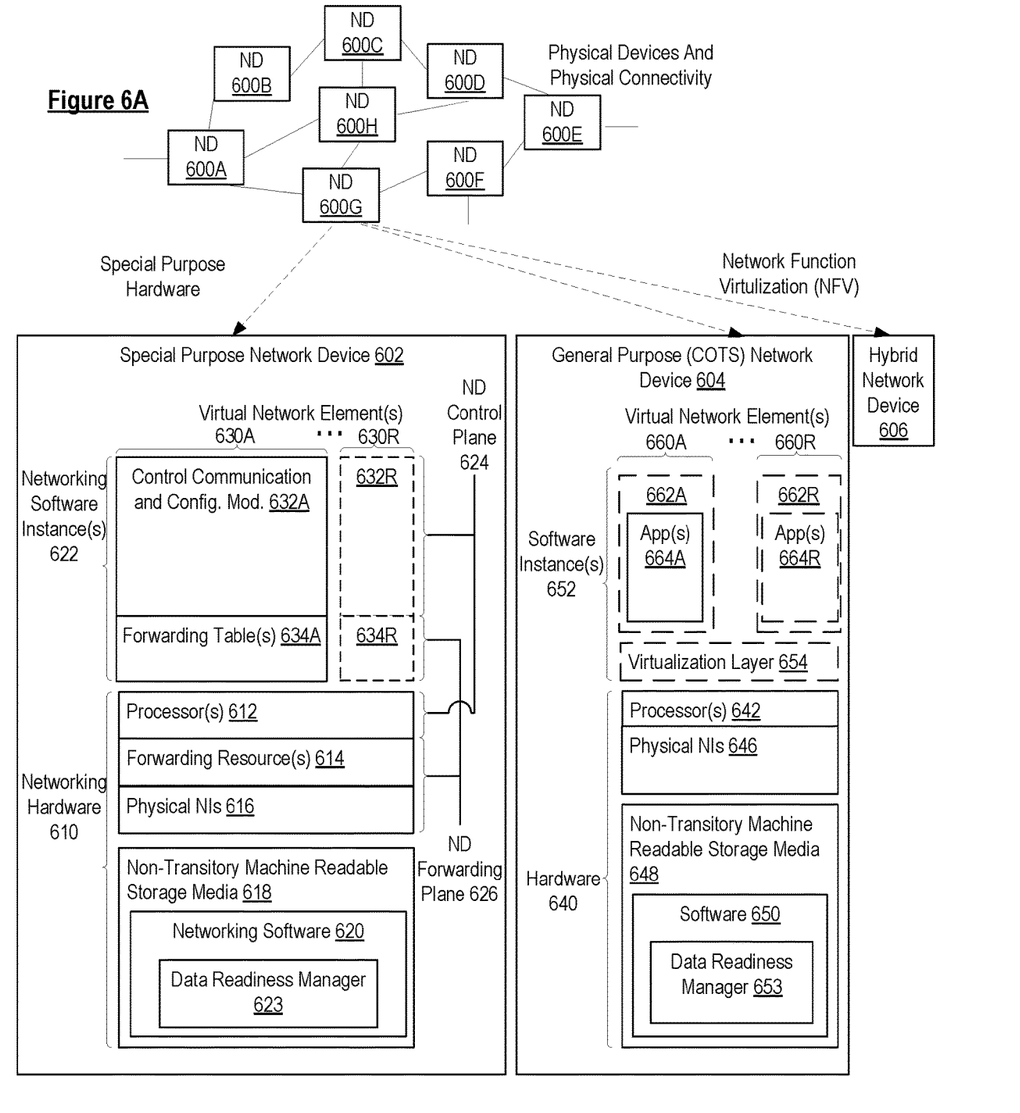
FIG. 6A illustrates connectivity between network devices (NDs) within an exemplary network, as well as three exemplary implementations of the NDs, according to some embodiments.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application—specific integrated—circuits (ASICs) and a special-purpose operating system (OS); and 2) a general purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

In an embodiment, software 620 includes code such as data readiness manager component 623, which when executed by networking hardware 610, causes the special-purpose network device 602 to perform operations of one or more embodiments disclosed herein (e.g., to perform data readiness operations).

Figure 6B:
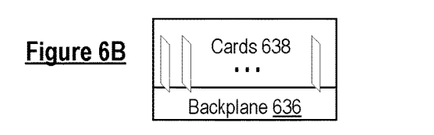
FIG. 6B illustrates an exemplary way to implement a special-purpose network device, according to some embodiments.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and physical NIs 646, as well as non-transitory machine readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

In an embodiment, software 650 includes code such as data readiness manager component 653, which when executed by hardware 640, causes the general purpose network device 604 to perform operations of one or more embodiments disclosed herein (e.g., to perform data readiness operations).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments are not described with reference to any particular programming language. It will be appreciated that a variety of programming languages may be used to implement the teachings of embodiments as described herein.

An embodiment may be an article of manufacture in which a non-transitory machine-readable storage medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments have been presented through flow diagrams. It will be appreciated that the order of transactions and transactions described in these flow diagrams are only intended for illustrative purposes and not intended to be limiting. One having ordinary skill in the art would recognize that variations can be made to the flow diagrams.

In the foregoing specification, embodiments have been described with reference to specific exemplary embodiments thereof. It will be evident that various modifications may be made thereto without departing from the broader spirit and scope of the disclosure provided herein. The specification and drawings are, accordingly, to be regarded in an illustrative sense rather than a restrictive sense.

What is claimed is:

1. A method performed by one or more computing devices implementing a data readiness manager to proactively replicate user session data in a distributed edge cloud, the method comprising:
receiving, from a local data management agent of a source data node, an indication to perform data readiness operations for a user session, wherein the source data node is associated with a service instance being accessed by a user associated with the user session;
determining a predicted mobility of the user;
determining two or more target data nodes based on the predicted mobility of the user, wherein each of the two or more target data nodes is associated with a service instance that is determined to have a sufficiently high probability of being accessed by the user at a future time; and
causing data associated with the user session to be continually replicated from the source data node to each of the two or more target data nodes as the service instance associated with the source data node makes changes to the data associated with the user session as a result of the user accessing the service instance associated with the source data node.

2. The method of claim 1, further comprising:
responsive to receiving the indication to perform data readiness operations for the user session and determining that there are active data replication operations being performed for the user session, causing the active data replication operations being performed for the user session to be terminated.

3. The method of claim 1, wherein the indication to perform data readiness operations for the user session includes a session identifier of the user session.

4. The method of claim 1, wherein the indication to perform data readiness operations for the user session is sent by the local data management agent of the source data node to the data readiness manager due to the local data management agent of the source data node detecting that data associated with the user session stored in the source data node is being accessed by the service instance associated with the source data node.

5. The method of claim 1, wherein the predicted mobility of the user is determined based on one or more of: a current location of the user, historical mobility patterns of the user, historical mobility patterns of other users, and traffic paths information.

6. The method of claim 5, wherein the user operates a user device connected to a mobile network, wherein the method further comprises:
communicating with the mobile network to obtain one or more of: the current location of the user, the historical mobility patterns of the user, and the historical mobility patterns of other users.

7. The method of claim 1, wherein the predicted mobility of the user is determined using a machine learning system.

8. The method of claim 1, wherein part of the data associated with the user session that is replicated to a target data node is stored in an in-memory layer of the target data node while another part of the data associated with the user session that is replicated to the target data node is stored in a persistent layer of the target data node.

9. The method of claim 1, further comprising:
responsive to determining that one or more other users share a sufficiently similar predicted mobility as the user, causing data associated with user sessions associated with the one or more other users to be replicated from the source data node to each of the two or more target data nodes.

10. The method of claim 1, wherein causing the data associated with the user session to be replicated from the source data node to each of the two or more target data nodes involves communicating with the local data management agent of the source data node and/or communicating with one or more local data management agents of the two or more target data nodes.

11. The method of claim 10, further comprising:
registering the local data management agent of the source data node and the one or more local data management agents of the two or more target data nodes, with the data readiness manager.

12. A non-transitory machine-readable storage medium that provides instructions that, if executed by one or more processors of one or more computing devices implementing a data readiness manager, causes the one or more computing devices to perform operations comprising:
receiving, from a local data management agent of a source data node, an indication to perform data readiness operations for a user session, wherein the source data node is associated with a service instance being accessed by a user associated with the user session;
determining a predicted mobility of the user;
determining two or more target data nodes based on the predicted mobility of the user, wherein each of the two or more target data nodes is associated with a service instance that is determined to have a sufficiently high probability of being accessed by the user at a future time; and
causing data associated with the user session to be continually replicated from the source data node to each of the two or more target data nodes as the service instance associated with the source data node makes changes to the data associated with the user session as a result of the user accessing the service instance associated with the source data node.

13. The non-transitory machine-readable storage medium of claim 12, wherein the operations further comprise:
responsive to receiving the indication to perform data readiness operations for the user session and determining that there are active data replication operations being performed for the user session, causing the active data replication operations being performed for the user session to be terminated.

14. The non-transitory machine-readable storage medium of claim 12, wherein the indication to perform data readiness operations for the user session includes a session identifier of the user session.

15. The non-transitory machine-readable storage medium of claim 12, wherein the indication to perform data readiness operations for the user session is sent by the local data management agent of the source data node to the data readiness manager due to the local data management agent of the source data node detecting that data associated with the user session stored in the source data node is being accessed by the service instance associated with the source data node.

16. The non-transitory machine-readable storage medium of claim 12, wherein the predicted mobility of the user is determined based on one or more of: a current location of the user, historical mobility patterns of the user, historical mobility patterns of other users, and traffic paths information.

17. The non-transitory machine-readable storage medium of claim 16, wherein the user operates a user device connected to a mobile network, wherein the operations further comprise:
communicating with the mobile network to obtain one or more of: the current location of the user, the historical mobility patterns of the user, and the historical mobility patterns of other users.

18. The non-transitory machine-readable storage medium of claim 12, wherein the predicted mobility of the user is determined using a machine learning system.

19. The non-transitory machine-readable storage medium of claim 12, wherein part of the data associated with the user session that is replicated to a target data node is stored in an in-memory layer of the target data node while another part of the data associated with the user session that is replicated to the target data node is stored in a persistent layer of the target data node.

20. The non-transitory machine-readable storage medium of claim 12, wherein the operations further comprise:
responsive to determining that one or more other users share a sufficiently similar predicted mobility as the user, causing data associated with user sessions associated with the one or more other users to be replicated from the source data node to each of the two or more target data nodes.

* * * * *

UNITED STATES PATENT AND TRADEMARK OFFICE
CERTIFICATE OF CORRECTION

| | | |
|---|---|---|
| PATENT NO. | : 12,255,954 B2 | Page 1 of 1 |
| APPLICATION NO. | : 17/936775 | |
| DATED | : March 18, 2025 | |
| INVENTOR(S) | : Feng et al. | |

It is certified that error appears in the above-identified patent and that said Letters Patent is hereby corrected as shown below:

In the Specification

In Column 4, Line 39, delete "probably" and insert -- probability --, therefor.

In Column 6, Lines 13-14, delete "probably" and insert -- probability --, therefor.

In Column 14, Line 63, delete "j ails)" and insert -- jails) --, therefor.

Signed and Sealed this
Twenty-third Day of September, 2025

John A. Squires
*Director of the United States Patent and Trademark Office*